Patented Sept. 25, 1951

2,568,850

UNITED STATES PATENT OFFICE 2,568,850

VAPOR BARRIER PAPER AND THE MANUFACTURE THEREOF

George Arthur Fasold, Mount Healthy, and Howard E. Callahan, Silverton, Ohio, assignors to The Philip Carey Manufacturing Company, a corporation of Ohio No Drawing. Application April 11, 1951,
Serial No. 220,542

8 Claims. (Cl. 117—158)

This invention relates to vapor barrier paper and the manufacture thereof and is a continuation-in-part of our application Serial No. 748,116 filed May 14, 1947. Vapor barrier paper finds extensive use, particularly in connection with the construction of buildings, for the purpose of preventing moisture contained in the atmosphere in the interior of a building from reaching elements of the exterior walls of the building which, in cold weather, are below the dew point of the atmosphere in the interior of the building.

In order to prevent heat losses from buildings which are heated in cold weather it has been common practice, especially in recent years, to provide thermal insulating material in the exterior side walls, or in the roof, or in ceilings above those portions of the building that are supplied with heat. Such thermal insulation usually is in the form of porous masses of fibrous material such as fibrous mineral, e. g., rock wool, slag wool, glass fibers or the like, or organic fibers. Such masses may be provided in the form of preformed bats or other preformed bodies, or may be deposited in an unformed condition as by blowing it in. When such thermal insulation is employed the moisture in the atmosphere in the interior of the building readily penetrates through the interior finish of the walls or ceilings, and into or through the thermal insulation, and when this moisture causes the moisture content of atmosphere in contact with cold surfaces to be in excess of the dew point at the surface temperature condensation occurs. The condensed moisture gives rise to numerous difficulties due to its deteriorating effect on wood or metal structural members, production of "damp spots" on the interior walls, etc. Moreover, the presence of condensate in the thermal insulation seriously detracts from its thermal insulating efficiency and tends to cause deterioration especially when the insulation is composed of or contains organic fibers, or contains an organic binder. While there are certain types of thermal insulation such as porous or cellular glass blocks or porous or foam-like bodies of plastic material which are less readily penetrated by moisture as compared with fibrous thermal insulation materials, such thermal insulation materials are considerably more costly and do not prevent moisture from travelling around the edges thereof or through the studding or through other avenues with resultant difficulties due to condensation.

In order to overcome the difficulties above mentioned there has been extensive use of vapor barrier paper, particularly in conjunction with the employment of thermal heat insulation in buildings. The vapor-barrier paper is positioned between the thermal insulation and the interior of the building so that it will not fall below the dew point of the atmosphere in the interior of the building while preventing passage of moisture into or around or through the thermal heat insulation where it could condense in cold weather. The vapor-barrier paper may be supplied separately, e. g., in the form of rolls for application as by nailing it to the interior of the studding of exterior walls or underneath the joists of a roof or ceiling. Alternately the vapor-barrier paper may be made an integral part of bats or other formed bodies of thermal heat insulation as by use of an adhesive. In the latter case, the vapor-barrier paper is generally made to extend somewhat beyond opposite sides of the bat or other formed body for ready securement to studding or joists.

The provision of a vapor-barrier paper presents considerable difficulty purely from the point of view of providing adequate impermeability to moisture, for moisture in the atmosphere has a remarkable facility for permeating through a body or sheet when the relative humidity on opposite sides of the body or sheet is substantially different. It is for this reason that the most extensively used vapor-barrier paper consists of a paper sheet, such as ordinary kraft paper, which has been thoroughly impregnated with paraffin wax and coated on one or both sides with a coating of asphalt which generally has a softening point of about 220° F. The impregnation with paraffin wax is regarded as essential in order to provide adequate moisture impermeability, for the asphalt coating by itself, while providing considerable moisture impermeability, is not sufficient in itself to prevent sufficient moisture penetration to cause serious condensation problems in buildings. In fact the asphalt coating is used primarily for the purpose of providing an inexpensive thermoplastic adhesive which, upon being heated, can be used to make the vapor-barrier paper adherent to preformed bats or other bodies of thermal insulation material.

Vapor-barrier paper of the character aforesaid, while quite effective in minimizing moisture permeability, has the great disadvantage of constituting a fire hazard. Paper such as kraft paper burns very readily by itself and its inflammability is greatly enhanced by its impregnation with paraffin wax and by its being coated with asphalt. In the case of conventional vapor-barrier paper installed in the side wall of a building, for example, it is very easily ignited and once ignited the paper is extremely susceptible to rapid spread of flame upwardly with the result that if a zone of combustion should start adjacent the base of a wall, the vapor-barrier paper burns very rapidly and it requires only a few moments' time for the flame to travel to the eaves. This greatly increases the fire hazard in many types of building construction.

It is an object of this invention to provide vapor-barrier paper which while exhibiting extremely low permeability to vapor also has extremely high resistance to combustion and spread of flame.

The aforesaid object of this invention has been successfully attained by providing a coating for paper which contains a substantial amount of a humectant in combination with bitumen and with a water soluble alkali metal silicate. Bitumens of appropriate softening point for emulsification in aqueous media can be caused to occur in emulsified condition in a solution of alkali metal silicate. If a solution of alkali metal silicate containing emulsified bitumen is applied to a paper sheet to provide a coating, increased fire resistance is afforded as compared with a coating consisting essentially of bitumen but under the conditions of normal use of the resulting coated sheet as a vapor-barrier satisfactory overall continuity and impermeability to moisture are not afforded. It is one of the principal features of this invention that this difficulty was successfully overcome by incorporating in the coating as applied, a humectant material, e. g., glycerine. The fact that a highly effective vapor-barrier could be afforded utilizing a coating material containing a substantial amount of a humectant which tends to absorb moisture from the air was surprising for one would normally expect that the presence of the humectant would promote moisture permeability. However, as the tests mentioned below demonstrate, the contrary fact was found to be the case. The humectant appears to have the effect of preventing the occurrence of flaws, minute cracks and the like which otherwise tend to occur or develop in the coating, and, while having some tendency to attract moisture from atmosphere, it tends to hold any moisture thus attracted within the coating without permitting the moisture to pass through from an atmosphere on one side of the coated paper to an atmosphere on the other side having less relative humidity. The presence of the humectant also contributes to the fire resistiveness of the coating.

In order to provide a coated paper according to this invention which is effective as a vapor-barrier and which at the same time possesses high fire resistive properties, the relative proportions of bitumen, alkali metal silicate and humectant should be within critical limits. The base of the coating that is applied to the paper consists of the bitumen and alkali metal silicate which in combination constitute from about 70% to about 95% by dry weight of coating and preferably about 80% to about 90% by dry weight of the coating. The humectant that is employed constitutes about 5% to about 30% by dry weight of the coating and preferably constitutes about 10% to about 20% by dry weight of the coating. In the base which consists of the bitumen and alkali metal silicate the bitumen may vary from about 30% to about 60% by dry weight of the base while the alkali metal silicate may vary from about 40% to about 70% by dry weight of the base. In other words, the ratio of alkali metal silicate to bitumen by dry weight varies from about 7:3 to about 2:3, and preferably is between about 7:3 and about 4:3. The ratio by dry weight of the humectant to the alkali metal silicate is ordinarily between about 1:15 and about 1:1 and is preferably between about 1:5 and 1:2.

The softening point of the bitumen that is employed should be appropriate for dispersion of the bitumen in the form of an aqueous emulsion. Ordinarily difficulty is encountered in successfully producing an aqueous emulsion if the softening point of the bitumen used is above about 160° F.; and for this reason the softening point of the bitumen that is employed in the practice of this invention is correspondingly limited. On the other hand, the bitumen should not have a softening point below about 100° F. Preferably the bitumen that is employed according to this invention has a softening point of the order 120° F. to 140° F. The softening point that is referred to is the softening point as determined by the standard ring and ball softening point test. The bitumen that is employed ordinarily is an asphalt such as that derived from the refining of Mid-Continent crudes, although other asphalts are suitable, e. g., asphalts derived from Mexican, Venezuelan or Colombian crudes. In addition to asphalts, other bitumens such as pitches, coal tar and the like may be employed in the practice of this invention. Moreover, a modifier, e. g., of a resinous or oily character that may be mixed with the bitumen is to be regarded as part of the bitumen. Selection of bitumen having relatively high ductility is normally preferred such as asphaltic residua from Mid-Continent crudes.

The alkali metal silicate that is employed is water-soluble alkali metal silicate, namely, either sodium silicate or potassium silicate or a mixture thereof, although sodium silicate is generally employed due to its lower cost. In order to afford satisfactory fire resistive properties the ratio of $SiO_2$ to alkali metal oxide should be at least 1.6:1. The upper limit of the ratio of $SiO_2$ to alkali metal oxide may be whatever is consistent with formation of a water solution of the alkali metal silicate. Thus in the case of sodium silicate the ratio of $SiO_2$ to $Na_2O$ may be increased to about 4:1, but the $SiO_2$ tends to precipitate out if the ratio of $SiO_2$ to $Na_2O$ exceeds about 4:1. Similarly in the case of potassium silicate $SiO_2$ tends to precipitate out if the ratio of $SiO_2$ to $K_2O$ exceeds about 3:1. For mixtures of sodium and potassium silicates, the $SiO_2$ tends to precipitate out between the ratio of 4:1 in the case of pure sodium silicate and the ratio of 3:1 in the case of pure potassium silicate in a roughly proportional relation between these ratio values. More generally the ratio of $SiO_2$ to alkali metal oxide in the alkali metal silicate that is employed according to this invention is of the range from about 1.6:1 to about 4:1. Preferably this ratio is between 2:1 and 3.5:1. In ordinary practice the grade of sodium silicate of the type most commonly placed on the market is employed, namely, sodium silicate in which the ratio of $SiO_2$ to $Na_2O$ is about 3.2:1. A solution of about 42° Bé is suitable.

For application to the paper the bitumen is produced in the form of an emulsion in an aqueous medium, the bitumen and alkali metal silicate being in the proper relative proportions by dry weight desired in the coating. In usual practice an aqueous bituminous emulsion is first prepared and the aqueous bituminous emulsion is then mixed with the silicate solution. However, one might alternatively emulsify the bitumen directly in the silicate solution. The bituminous emulsion in the aqueous alkali metal silicate solution may contain whatever proportion of water to non-volatile constituents is regarded as appropriate for application purposes for producing a coating of desired thickness. Usually the proportion of water is of the order of 40% to 65%, and it has been found to afford good operating consistency when the proportion of water in the emulsified bitumen-silicate solution is of the order of 45% to 60%. The emulsification of the bitumen can be accomplished in any of a number of known ways for preparing bituminous emulsions. Usually an emulsifying agent is employed. Bentonite clay is a suitable emulsifying agent and has the advantage of being both inexpensive and highly effective. Soap likewise is very effective as well as inexpensive. Other emulsifying agents also may be employed such as casein, blood, triethanolamine, rosin soaps, sulphonated oils, soaps of sulphonated oils, naphthenic acid soaps, etc. Some bitumens contain a small proportion of complex acidic constituents which are reactive with the alkali in an alkali metal silicate to form soap or a soap-like substance which is effective as an emulsifying agent for the bitumen. In any event the emulsifying agent that is present merely serves the temporary purpose of obtaining the bitumen in emulsified form so that it may be blended homogeneously with the silicate solution for application to the surface of a paper sheet by a suitable coating operation. By way of example, when bentonite clay is used as an emulsifying agent about 4% on the weight of the bitumen is usually sufficient to obtain a satisfactory bituminous emulsion. In the dried coating the bentonite clay in such case is present in an amount varying from about 1% to about 2.5% of the dry weight of the coating but is not a significant factor in the finished coated paper either in affording impermeability to moisture or in affording high fire resistive properties. Somewhat more generally the bitumen, alkali metal silicate and the humectant in the relative proportions above mentioned are the basic ingredients of the fire resistive vapor-barrier coating although a small proportion of a material such as emulsifying agent or some diluent or extender such as very finely divided clay or talc or other finely divided filler may be present but preferably in amounts less than about 10% by dry weight of the coating.

The humectant that is employed according to this invention is incorporated in the emulsion prior to its application to paper as a coating so that the humectant will be distributed uniformly throughout the material of the applied coating. The humectant is freely soluble in the aqueous base of the emulsion. It may be incorporated in any way that is convenient. Thus it may be added to the bituminous emulsion before the bituminous emulsion is blended with the silicate solution or it may be incorporated initially in the silicate solution. Alternatively, the humectant may be incorporated after the bitumen has been caused to occur in emulsized condition in the silicate solution. Humectants such as glycerine, ethylene glycol and propylene glycol are especially suitable for use according to this invention. These humectants are highly effective to afford the improvements of this invention as incorporated in the finished coating. Moreover, these humectants do not exercise any adverse effect on the emulsion prior to its application to provide a coating for the paper. It is, of course, the case that the humectant selected should not cause gelation of the silicate or breaking of the bituminous emulsion. In this connection it is well known that the silica contained in alkali metal silicate solution is maintained in dissolved condition due to the alkali present and that any substantial reaction of an acidic substance with the alkali in an alkali metal silicate solution results in precipitation of the silica and formation of silica gel. This is the principal consideration in connection with the selection of the humectant employed, for there are certain substances such as calcium chloride which, while exhibiting very pronounced humectant properties, are definitely reactive and serve to precipitate the silica in the soluble silicate solution in which the bitumen is emulsified. Therefore the humectant that is selected for the practice of this invention should be a "compatible" humectant in the sense that it is consistent with the occurrence of the alkali metal silicate in water soluble condition and with the distribution of the bitumen in emulsified condition in the silicate. Such compatibility if prevailing in the emulsion as applied to the paper is also exhibited in the applied coating, and, of course, is readily observable. Other compatible humectants which may be employed in the practice of this invention are sorbitol and triethyl phosphate, although these substances are somewhat less desirable as compared with glycerine, ethylene glycol and propylene glycol. Due to its low cost and high degree of effectiveness for use according to this invention, the humectant which is preferably employed in the practice of this invention is glycerine. While the humectant component of the coating may consist of a single compatible humectant, the humectant component may consist of a mixture of compatible humectants. Thus, any of the above exemplified humectants may be used alone as constituting the humectant component of the coating or a mixture of any two or more of the above exemplified humectants may be employed as constituting the humectant component of the coating. By way of further illustration, when any one of the above exemplified humectants, e. g., triethyl phosphate, is employed in conjunction with any one or more of the other of the above exemplified humectants, the amount by dry weight of humectant in the coating is the sum of the amounts by dry weight of the individual humectants contained in the coating, and the aforesaid limitations as regards amount of humectant in the coating are equally applicable whether the humectant component of the coating consists of one humectant or a plurality of humectants.

The paper to which the coating is applied may be selected as desired. Ordinarily kraft paper is employed inasmuch as it is relatively inexpensive and has relatively high strength appropriatte for handling and application in the walls of buildings as a vapor-barrier. Other papers may likewise be employed, e. g., papers derived from fibers such as sulphate fibers, ground wood, news print, etc. Mineral fibers such as asbestos fibers may also be employed but usually are not employed due to the fact that they tend to afford a relatively weak paper and do not contribute materially in affording the fire resistive properties that are afforded according to this invention. The paper that is employed may be of any desired thickness but usually corresponds with conventional paper as to thickness, the preferred thickness being of the order of about 0.003 to 0.010 inch. A kraft paper about 0.005 inch in thickness is very well suited to afford a fire resistive vapor-barrier when coated according to this invention.

In producing the fire resistive vapor-barrier paper of this invention all that is required is the application of the emulsion of bitumen in the alkali metal silicate solution containing the dissolved humectant to one or both surfaces of the paper so as to produce a coating of substantial thickness. In the usual case the emulsion is applied so that the non-volatile constituents of the emulsion constitute from about 2 to about 10 pounds per 100 square feet of area coated. When a relatively heavy paper is employed the non-volatile constituents applied to provide the coating may be somewhat in excess of 10 pounds per 100 square feet of area coated. The emulsion may be applied in any suitable way, there being several types of suitable coating equipment which are well known and which may be used. For example, the emulsion may be brought into contact with the paper and then spread to desired thickness by use of spreading rolls, a doctor blade, brushing or other conventional spreading means. Thereafter the coating is merely dried either at ordinary temperatures or when mildly heated as by passing the paper over heated drying rolls.

It is usually desirable in the production of the fire resistive vapor-barrier paper according to this invention to dust on the surface of the applied emulsion coating before the coating has lost its tackiness a dusting of anti-stick material such as fine mica, talc, or the like although this is not essential to obtaining either moisture imperviousness or fire resistiveness. The amount of dusting material employed may be of the order of about 0.5 to about 1.5 pound per 100 square feet of area as applied to the surface of a coating. Application of a dusting powder consisting of about 95% fine mica and about 5% of aluminum powder has been found to be highly desirable when applied to the surface of a coating at the rate of about 1 pound per 100 square feet of area. This provides an attractive finish, and the aluminum powder possesses considerable heat reflecting properties which impart some thermal heat insulating effectiveness to the coated fire resistive vapor-barrier paper.

When the fire resistive vapor-barrier paper of this invention is intended for separate use, namely, not as an integral surfacing of a preformed body of thermal heat insulation material, it is usually desirable, although not essential, to employ the fire resistive vapor-barrier coating on both surfaces of the paper. Moreover, the coating on each side of the paper can be dusted with the finely-divided anti-stick material. In such case the paper can be produced in convenient widths, e. g., 36 inches, and made up into rolls of any predetermined sheet length.

When the fire resistive vapor-barrier paper of this invention is made adherent to a body of thermal heat insulation material, then it is usually desirable to apply the special fire resistive vapor-barrier coating to one side only of the paper. The surface of this coating can be dusted with anti-stick material if it is regarded as desirable to do so. For bonding the coated paper to a body of thermal heat insulation material, the surface opposite to the surface carrying the special coating may be provided with a conventional asphalt coating, e. g., a coating of asphalt having a softening point of about 220° F. applied at the rate of about three to about five pounds per 100 square feet of area. This coating may be applied in a heat liquefied condition. The coating is such that if a body of thermal heat insulation material, e. g., a bat of rock wool, is brought into contact with the asphalt coating while the coating is heated so that it is tacky and sticky, the coated paper will adhere to the body of thermal heat insulation as a permanent surfacing therefor. The body of thermal heat insulation may be made adherent to the asphalt coating immediately after the asphalt coating is applied and while it is still tacky and adhesive, or the asphalt coating after having cooled may be reheated to make it tacky and adhesive. In such products, as mentioned above, it is the usual practice to have the vapor-barrier paper extend beyond opposite margins of the thermal insulation to which it is made adherent. Thus the thermal insulation may be in the form of a rock wool bat which comprises a small amount of binder to give it coherence and which may be 15 inches wide by 24 or 48 inches long. The vapor-barrier paper having an overall width of 17¾ inches is made adherent of one surface of the bat and folded flaps 1⅝ inches in width protrude from each side. At the time of use these flaps are unfolded and can be nailed to studding between which the bats are inserted.

The fire resistive properties of the special coating are due primarily to its composition as applied overlying the paper sheet to which it is applied. However, it may be mentioned that during the application of the emulsion of bitumen in alkali metal silicate solution containing the humectant, there is some penetration of the alkali metal silicate into the body of the paper. This serves to considerably reduce the inflammability of the paper, but, as mentioned above, this is not an essential factor in obtaining the high fire resistive properties of the coated paper considering the coated paper as a whole. In order to render the paper itself still more incombustible one can, if it is considered desirable to do so, impregnate the paper with alkali metal silicate solution preliminarily and before the vapor-barrier coating is applied. This has the effect of increasing the proportion of dried alkali metal silicate in the body of the paper. However, in normal practice the preliminary impregnation of the paper with alkali metal silicate solution is not resorted to for it contributes only slightly to the fire resistiveness of the paper, and from a manufacturing point of view is somewhat undesirable since it slows up the drying of the vapor-barrier coating that is subsequently applied. It would also be possible to preliminarily treat the paper to which the vapor-barrier coating is applied with some flame retarding material, such as ammonium sulfamite, borax, or a soluble phosphate. However, this is ordinarily not done since the fire resistiveness of the coated paper as a whole is increased only slightly by so doing and the addition of such material adds considerably to the cost of the paper. In this connection, it may be mentioned that the incorporation of flame retarding substances such as those above mentioned in paper which is coated with a conventional asphalt coating is wholly ineffective to afford fire resistive properties due to the inflammability of the coating.

The practice of this invention, as well as its effectiveness in affording a high degree of moisture imperviousness and a high degree of fire resistiveness, may be illustrated in connection with the following description of a specific example of the practice of this invention.

The bituminous emulsion employed had the following analysis:

|  | Wet Basis | Dry Basis |
|---|---|---|
|  | Per cent | Per cent |
| Asphalt (softening point 130–140° F.) | 54.4 | 96.3 |
| Water | 43.5 |  |
| Bentonite clay | 2.1 | 3.7 |

The silicate solution that was employed was conventional sodium silicate solution of approximately 42° Bé (containing about 60% water), the ratio of $SiO_2$ to $Na_2O$ being substantially 3.2:1.

Glycerine was used as the humectant, and was added to the bituminous emulsion before the bituminous emulsion was commingled with the sodium silicate solution.

The above mentioned materials were commingled in the following proportions:

Formula I

|  | Per cent |
|---|---|
| Sodium silicate solution | 71.3 |
| Asphalt emulsion | 23.7 |
| Glycerine | 5.0 | to form an emulsion formula containing

|  | Per cent |
|---|---|
| Water | 53.5 |
| Asphalt | 12.9 |
| Sodium silicate | 28.1 |
| Bentonite clay | 0.5 |
| Glycerine | 5.0 |

Formula II

|  | Per cent |
|---|---|
| Sodium silicate solution | 45.0 |
| Asphalt emulsion | 45.0 |
| Glycerine | 10.0 | to form an emulsion containing

|  | Per cent |
|---|---|
| Water | 46.7 |
| Asphalt | 24.5 |
| Sodium silicate | 17.8 |
| Bentonite clay | 1.0 |
| Glycerine | 10.0 |

The paper used was kraft paper substantially 0.005 inch in thickness (weighing substantially 17 pounds per 1000 square feet).

Example I

Example I was prepared by applying to each surface of the paper a coating utilizing the above mentioned coating of Formula I to provide on each surface a coating weighing after drying substantially 2.6 pounds per 100 square feet of area. Each coating was dried, but before the drying was completed and while it was still tacky there was applied to the exposed surface of each coating at the rate of one pound per 100 square feet of area a dusting consisting of 95% of finely divided mica and 5% of powdered aluminum. The finished paper weighed substantially 9 pounds per 100 square feet.

Example II

One side only of the paper sheet was coated with the special emulsion of Formula I so as to afford a coating which when dry weighed 2.6 pounds per 100 square feet of area and the surface of the coating was dusted at the rate of one pound per 100 square feet of area with the same dusting material employed in the preparation of Example I. The opposite surface of the paper was coated with asphalt having a softening point of about 220° F. by applying the asphalt in a heat liquefied condition at the rate of substantially 3.7 pounds per 100 square feet. No dusting was applied to the surface of the asphalt coating. The finished paper weighed substantially 9 pounds per 100 square feet.

The moisture permeability of the paper of Examples I and II was tested using the Official Standard T.448m–41 of the Technical Association Paper and Pulp Industry which corresponds with the A. S. T. M. Designation D 783–44T for Tensative Method of Test for Water Vapor Permeability of Paper and Paper Board. According to this test, a speciman of the paper is placed over the top of a container so as to provide a given area. The container holds a desiccant, and an atmosphere of controlled percent humidity at 73° F. is maintained on the other side of the paper to be tested. In carrying out the test, the container is inverted so that the desiccant is in direct contact with the paper. During the test, the gain in weight, which is due to moisture passing through the paper, is measured at stated intervals, and the rate of moisture passage is computed and is expressed in terms of grains per square foot per hour for the given conditions of humidity or vapor pressure of the atmosphere on the exterior of the container.

The paper of Examples I and II were tested as freshly prepared and after aging for eight weeks at 100° to 110° F. in an atmosphpere of circulating air. The performance was also determined of conventional vapor barrier paper consisting of the same weight kraft paper thoroughly impregnated with paraffin wax and coated on one side with asphalt having a softening point of about 220° F. at the rate of about 3.7 pounds per 100 square feet. The results of these tests are as follows, the values set forth being in grains of moisture passing through the paper per square foot per hour at one inch of mercury vapor pressure.

|  | As Prepared | After Aging |
|---|---|---|
| Example I | 0.87 | 0.16 |
| Example II | 0.87 | 0.16 |
| Conventional vapor barrier paper | 0.65 | 2.90 |

According to the A. S. T. M. standard for vapor barriers approved January 21, 1947 (as yet unpublished), the maximum permissible vapor permeability for an effective vapor barrier is 2.5 grains per square foot per hour at one inch of mercury vapor pressure. It is apparent that the vapor barrier paper of Examples I and II was well within this maximum value. Moreover, it is significant that, after aging, the vapor barrier effectiveness of the vapor barrier paper embodying this invention became considerably better and attained an extremely low figure. The sample of conventional vapor barrier paper exhibited good vapor barrier effectiveness as originally made up, but its effectiveness diminished on aging and after 8 weeks did not meet the A. S. T. M. standard.

The fire resistiveness of the vapor barrier paper of Examples I and II was tested at Underwriters' Laboratories, Inc. of Chicago, Illinois, utilizing the test equipment and procedure for determining the Fire Hazard Classification of Building Materials which are set forth in the Bulletin of Research of this organization No. 32, as published September 1944. Some of the elements involved in this test include the placing of the material to be tested so as to constitute the roof of a tunnel 11½ inches high, 17 inches wide and 25 feet long. A gas flame from a burner extends along about 5.5 feet of the sample at one end of the tunnel and an air current of 200 feet per minute is caused to move through the tunnel from the burner end toward, and out of, the other end. The rate of spread of flame, the fuel combustion of the material tested, and the smoke production are noted by appropriate recordings during the test which is usually discontinued 10 minutes after first flame application. As a scale for indicating relative performance, asbestos cement is taken as zero and red oak as 100 for each of the determinations made. In the tests as conducted, the paper of Example I was separately applied over a base of rock wool bats. The paper of Example II was bonded to the rock wool bats by the asphalt coating. The rock wool bats were also tested without the vapor barrier paper covering them. These rock wool bats consisted of rock wool containing a small amount of binder averaging about 2.04% on ether extraction. The ratings obtained were as follows:

|  | Rock Wool Bats Alone | Example I | Example II |
|---|---|---|---|
| Flame spread | 20 to 30 | 30 to 40 | 30 to 40 |
| Fuel consumed | 10 to 20 | 15 to 25 | 15 to 25 |
| Smoke developed | 30 to 40 | 20 to 30 | 20 to 30 |

It is seen that the vapor barrier paper of this invention possesses extremely high fire resistiveness, being comparable with the rock wool bats that were tested alone. For comparison, the conventional vapor barrier paper mentioned above, namely, consisting of kraft paper impregnated with paraffin and coated on one side with asphalt adhesive, was similarly tested. In this case, the flame travelled from the zone of application to the opposite end of the tunnel in only 14 seconds, indicating a rating value of over 2500 as compared with 100 for red oak. It is apparent that such vapor barrier paper constitutes a decided fire hazard due to its high degree of combustibility and due to its susceptibility to extremely rapid spread of flame.

A simpler test for determining fire resistiveness of paper products is a modification of that set forth in the report dated January 31, 1944, of the National Bureau of Standards and in the proposed A. S. T. M. Method for Determining Flammability of Treated Paper. According to this test, a small sample of paper to be tested, measuring 2¾ by 8¼ inches, is inclined at a 30° angle to the vertical above a Tirrell or Bunsen gas burner adjusted to give a 1½ inch high yellow flame with the air turned off, the tip of the flame being ¾ inch from the lower middle portion of the sample to be tested (2⅝ inches from the lower-most edge of the sample). The flame is applied for 12 seconds and then removed. Determination is made of the duration of flame after the burner is extinguished and the area that is severely charred is also noted. The test procedure prescribed by the National Bureau of Standards and A. S. T. M. is the same except that the sample is held in vertical position and the flame is applied with the tip of the flame ¾ inch from the lowermost edge of the sample.

Under the test above mentioned, the paper of Example I embodying this invention was virtually unaffected except for slight blackening immediately above the flame. The paper remained continuous and was only slightly weakened in the area immediately above the tip of the flame. The paper exhibited only slight burning of volatile constituents of the asphalt in the region immediately above the tip of the flame, and when the flame was removed, further combustion ceased immediately. There was no spread of flame. The paper of Example II behaved similarly except that the coating of straight asphalt on the back melted and drew away from the zone immediately above the flame exposing the back of the paper which was somewhat more charred than was the case with the paper of Example I, although the vapor barrier paper as a whole remained continuous. All combustion ceased immediately after the flame was removed and there was no spread of flame. By contrast, a sample of the conventional vapor barrier paper mentioned above when similarly tested was completely enveloped in flame within only two or three seconds after initial flame exposure and was consumed completely except for those portions confined within the jaws of the clamps used to hold the sample tested in position over the burner.

It is apparent from the foregoing that according to this invention a coated paper is afforded which, while possessing a very high degree of moisture imperviousness, also is highly fire resistive. Moreover, the vapor barrier paper of this invention has excellent aging properties. The fire resistive properties of the vapor barrier paper of this invention serve to eliminate virtually completely the fire hazard presented by conventional vapor barrier paper. Thus, the vapor barrier paper of this invention is extremely resistant to combustion even in an area of direct flame exposure and is highly resistant to spread of flame from and area of direct flame exposure. Moreover, as soon as direct exposure to flame is discontinued, there is virtually immediate extinguishing of further combustion.

While this invention has been described in connection with certain specific examples of the practice of this invention, it is to be understood that this has been done for illustrative purposes and that the scope of this invention is to be governed by the language of the following claims.

We claim:
1. A fire resistive vapor barrier paper which comprises a flexible paper sheet coated on at least one surface thereof with a coating having a base which consists of bitumen and water-soluble alkali metal silicate and which constitutes from about 70% to about 95% by dry weight of said coating, said base containing from about 30% to about 60% by dry weight of bitumen having a softening point of the range 100° F. to 160° F. and containing from about 40% to about 70% by dry weight of alkali metal silicate having a ratio of $SiO_2$ to alkali metal oxide of about 1.6:1 to about 4:1, and said coating containing from about 5% to about 30% by dry weight of triethyl phosphate.

2. A fire resistive vapor barrier coated paper which comprises a flexible paper sheet about 0.003 inch to about 0.01 inch in thickness coated on at least one side thereof with a dried coating of emulsion consisting essentially of bitumen emulsified in an aqueous solution of alkali metal silicate containing dissolved humectant consisting essentially of triethyl phosphate, said bitumen and said alkali metal silicate providing a base for said coating which constitutes from about 70% to about 95% by dry weight of said coating and of which from about 30% to about 60% by dry weight is bitumen and about 40% to about 70% by dry weight is alkali metal silicate, said bitumen having a softening point of about 100° F. to about 160° F., the ratio of $SiO_2$ to alkali metal oxide in said alkali metal silicate being between 1.6:1 and 4:1, said humectant consisting from about 5% to about 30% by dry weight of said coating, and said coating being applied at the rate of about 2 to about 10 pounds per 100 square feet of area.

3. A fire resistive vapor barrier coated paper according to claim 2 wherein said dried coating with which said flexible paper sheet is coated comprises finely-divided filler constituting not more than 10% by dry weight of said coating.

4. A flexible fire resistive vapor barrier paper wherein bitumen, alkali metal sliceate and triethyl phosphate are homogeneously intermingled in a continuous coating layer of substantial thickness applied to at least one surface of a paper sheet, the ratio by dry weight of said alkali metal silicate to said bitumen being between about 2:3 and about 7:3 and said bitumen plus said alkali metal silicate constituting from about 70% to about 95% by dry weight of said coating layer, the ratio by dry weight of said triethyl phosphate to said alkali metal silicate being between about 1:15 and about 1:1 and said triethyl phosphate constituting from about 5% to about 30% by dry weight of said coating layer, said asphalt having a softening point of about 100° F. to about 160° F., and the ratio of $SiO_2$ to alkali metal oxide in said alkali metal silicate being about 1.6:1 to about 4:1.

5. A fire resistive vapor barrier paper which comprises a flexible paper sheet coated on at least one side thereof with a dried coating of emulsion consisting essentially of bitumen emulsified in an aqueous solution of alkali metal silicate containing dissolved humectant consisting essentially of triethyl phosphate, the ratio by dry weight of said alkali metal silicate to said bitumen being between about 2:3 and about 7:3 and said alkali metal silicate plus said bitumen constituting from about 80% to about 90% by weight of said coating, the ratio by dry weight of said humectant to said alkali metal silicate being between about 1:5 and about 1:2 and said humectant constituting from about 10% to about 20% by dry weight of said coating, the softening point of said bitumen being about 120° F. to about 140° F., the ratio or $SiO_2$ to alkali metal oxide being about 2:1 to about 3.5:1, and said coating being applied at the rate of about 2 to about 10 pounds per 100 square feet of area.

6. A fire resistive vapor barrier paper according to claim 5 wherein said dried coating with which said flexible paper sheet is coated comprises finely-divided filler constituting not more than 10% by dry weight of said coating.

7. A method whereby paper is coated to provide a fire resistive vapor barrier which comprises applying as a coating to at least one surface of said paper an aqueous bituminous emulsion wherein bitumen is emulsified in an aqueous solution of alkali metal silicate containing a dissolved humectant consisting essentially of triethyl phosphate and drying said coating, the ratio of said alkali metal silicate to said bitumen by dry weight in said bituminous emulsion being between 2:3 and 7:3, said bitumen plus said alkali metal silicate constituting from about 70% to about 95% by dry weight of the non-volatile components of said emulsion, said humectant constituting from about 5% to about 30% by dry weight of the non-volatile components of said emulsion, the softening point of said bitumen being about 100° F. to about 160° F., and the ratio of $SiO_2$ to alkali metal oxide in said alkali metal silicate being about 1.6:1 to about 4:1.

8. A fire resistive vapor barrier coated paper which comprises a flexible paper sheet about 0.003 inch to about 0.01 inch in thickness coated on at least one side thereof with a dried coating of emulsion consisting essentially of bitumen emulsified in an aqueous solution of alkali metal silicate containing dissolved humectant consisting of triethyl phosphate and at least one of the group of humectants consisting of glycerine, ethylene glycol, propylene glycol and sorbitol, said bitumen and said alkali metal silicate providing a base for said coating which constitutes from about 70% to about 95% by dry weight of said coating and of which from about 30% to about 60% by dry weight is bitumen and about 40% to about 70% by dry weight is alkali metal silicate, said bitumen having a softening point of about 100° F. to about 160° F., the ratio of $SiO_2$ to alkali metal oxide in said alkali metal silicate being between 1.6:1 and 4:1, said humectant constituting from about 5% to about 30% by dry weight of said coating, and said coating being applied at the rate of about 2 to about 10 pounds per 100 square feet of area.

GEORGE ARTHUR FASOLD.
HOWARD E. CALLAHAN.

No references cited.

Certificate of Correction

Patent No. 2,568,850 September 25, 1951

GEORGE ARTHUR FASOLD ET AL.

It is hereby certified that error appears in the printed specification of the above numbered patent requiring correction as follows:

Column 6, line 61, for "appropriatte" read *appropriate*; column 13, line 10, for "consisting" read *constituting*; line 55, strike out "ratio or" and insert instead *ratio of*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*